J. H. MACALPINE.
REDUCTION GEARING.
APPLICATION FILED SEPT. 8, 1910.

1,026,629.

Patented May 14, 1912.
2 SHEETS—SHEET 1.

WITNESSES:

INVENTOR.

BY

HIS ATTORNEY IN FACT.

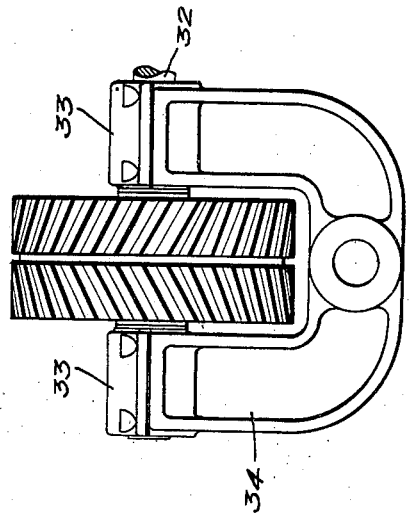
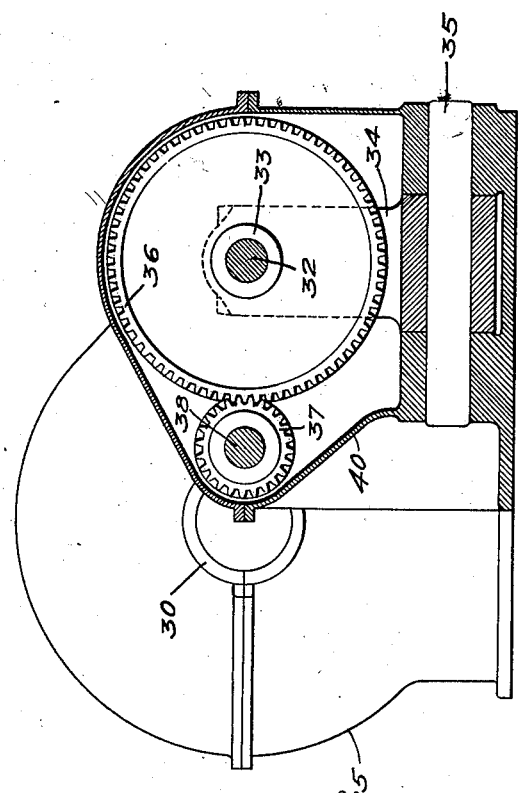

UNITED STATES PATENT OFFICE.

JOHN H. MACALPINE, OF PITTSBURGH, PENNSYLVANIA.

REDUCTION-GEARING.

1,026,629.  Specification of Letters Patent.  Patented May 14, 1912.

Application filed September 8, 1910. Serial No. 580,975.

*To all whom it may concern:*

Be it known that I, JOHN H. MACALPINE, a citizen of the United States, and a resident of Pittsburgh, in the county of Allegheny and State of Pennsylvania, have made a new and useful Invention in Reduction-Gearing, of which the following is a specification.

This invention relates to change speed gearing and has for its object to provide means whereby any desired ratio between driving and driven elements may be effected.

A change speed unit generally consists of a pinion and a gear, or a set of pinions and a set of gears; one of these imparting motion to the other, as for example, the reduction gearing illustrated in the United States Patent No. 946,455 granted to George W. Melville and myself January 11th, 1910. With such a gearing, the best results are obtained with ratios lying between certain numerical values of reduction and it is not considered good engineering to have too great a ratio between the diameters of pinion and gear.

I propose to accomplish changes in speed by combining a plurality of change speed units, as for example, two sets of gears and pinions. Thus, the proper proportion of gears and pinions in each set may be maintained, and any reduction may be accomplished by multiplying the number of reduction units (herein shown as consisting each of a pinion and a gear).

Figure 1:
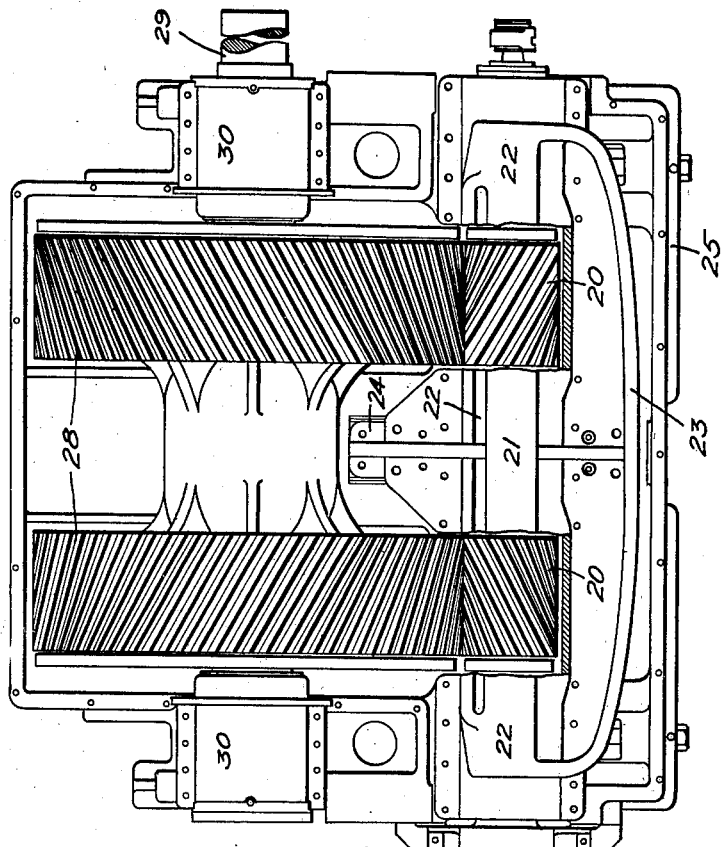
Figure 1:
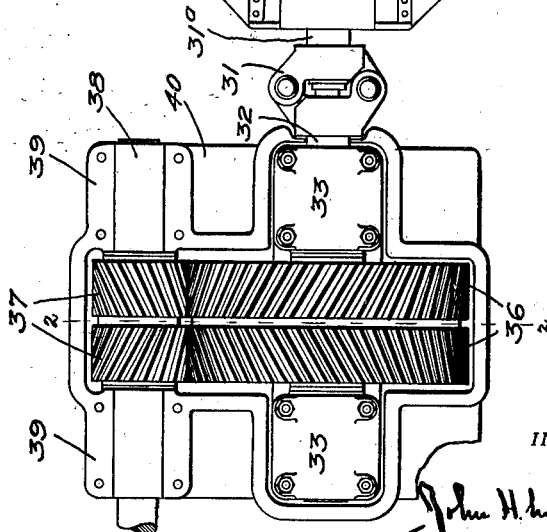

In the drawings: Figure 1 is a plan view of two change speed gear units coupled together. Fig. 2 is a sectional view on the line 2—2 of Fig. 1; and Fig. 3 is a detailed view of a floating frame in a gear carried thereby.

Referring now to the drawings by numerals of reference, 20 indicates a pair of pinions mounted on a shaft 21 journaled in bearings 22 carried in the floating frame 23. The floating frame is mounted upon two I-beams 24. The I-beams 24 are secured to the bed plate 25 in any suitable manner. A pair of gears 28 is carried by a suitable element 29 which is journaled in bearings 30. The gears 28 mesh with the pinions 20 and the carrying member of the gears is adapted to deliver power through any suitable coupling to the apparatus to be driven. The bearing member 21 of the pinions is connected to another reduction unit (here shown as being approximately of the construction illustrated in Patent No. 946,456 granted to George W. Melville and myself January 11th, 1910) through a flexible coupling 31 on the flexible shaft 31$^a$ carried by the shaft 21 to a shaft or gear carrying member 32 journaled in suitable bearings 33 in a frame 34 mounted on a pin 35. The member 32 is provided with gears 36, which mesh with pinions 37 on a shaft 38 in bearings 39 in the support 40. The shaft 38 may be connected to the driving element, as for example, the turbine; the power being communicated through the pinions 37, gears 36 and shaft 32 to the shaft 21, the pinions 20 will communicate motion to the gears 28 causing the shaft 29 to rotate and thereby impart motion to the driven element.

It will be observed by reference to Fig. 1 that the unit consisting of the pinions 37 and gears 36, together with their appurtenances, are somewhat smaller than the unit including the pinions 20 and the gears 28. This is the result of good engineering, and while it has its advantages, it is not absolutely essential that there be a difference between relative sizes of two units. It will also be observed by reference to Fig. 1 that the floating frame, forming a part of one of the units, may have angular motion independent of the floating frame of the other unit; this being possible on account of the flexible coupling 31 and flexible shaft 31$^a$. Attention is also directed to the fact that the shaft 38 will be the high speed shaft; and that dependent upon the differences in the diameters between the pinions and the gears, the shaft 32 will assume a proportionately slower rate of revolution and that the same speed will be imparted to the shaft 21. The shaft 21 will partake of the slow speed of the first unit, and will impart a proportionately slower speed to the gears 28, and consequently to the shaft 29. If it is desired to have a still lower rate of speed for the driven element, another reduction gear unit may be coupled to the shaft 29 to be interposed between the driving element and the driven element. Inasmuch as the specific construction of the mounting details plays no important part in this application, I have deemed it unnecessary to go into a detailed description thereof; it being understood that the invention here consists in combining a plurality of reduction gear units so as to take care of wide variations in speed changes and still maintain the proper relative proportions between the high speed element and the low speed element of the unit.

Having thus described my invention, what I claim is:

1. The combination of two gear-carrying shafts, frames supporting said shafts, yielding supports for said frames and a coupling connecting said shafts.

2. The combination of two gear-carrying shafts, frames carrying said shafts, yielding means supporting said frames and a flexible coupling connecting said shafts.

3. The combination of a plurality of change speed units, each unit consisting of two shafts having inter-meshing gears and one shaft of each unit being mounted in bearings capable of permitting the gears on the shaft to have angular movement with respect to the gears with which they mesh, and a coupling for connecting the shafts having such angular movement together.

4. The combination of two change speed units, each of which is provided with gear driving shafts mounted in yielding bearings and means for connecting said shafts together.

5. The combination of two gear carrying shafts mounted in yielding bearings and a coupling connecting said shafts.

6. The combination of two gear carrying shafts mounted in yielding bearings and a flexible coupling connecting said shafts.

7. In combination, two reduction gear units, each of which is provided with a gear-carrying shaft, a frame supporting each of said shafts, means for yieldingly mounting each of said frames and a flexible coupling for connecting said shafts together.

In testimony whereof, I have hereunto subscribed my name this 6th day of September, 1910.

JOHN H. MACALPINE.

Witnesses:
C. W. McGhee,
B. F. Funk.

---

Copies of this patent may be obtained for five cents each, by addressing the "Commissioner of Patents, Washington, D. C."